(12) United States Patent
Geri et al.

(10) Patent No.: US 11,795,378 B2
(45) Date of Patent: Oct. 24, 2023

(54) IRON CONTROL COMPOSITION, MAKE, AND USE IN CARBONATE STIMULATION

(71) Applicant: King Fahd University of Petroleum and Minerals, Dhahran (SA)

(72) Inventors: Badr Ba Geri, Dhahran (SA); Mohamed Mahmoud, Dhahran (SA); Salaheldin Elkatatny, Dhahran (SA); Shirish Patil, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 267 days.

(21) Appl. No.: 16/386,468

(22) Filed: Apr. 17, 2019

(65) Prior Publication Data

US 2020/0332178 A1    Oct. 22, 2020

(51) Int. Cl.
*E21B 43/25* (2006.01)
*C09K 8/74* (2006.01)
*C09K 8/54* (2006.01)
*E21B 41/02* (2006.01)

(52) U.S. Cl.
CPC .................. *C09K 8/74* (2013.01); *C09K 8/54* (2013.01); *E21B 41/02* (2013.01); *E21B 43/25* (2013.01); *C09K 2208/32* (2013.01)

(58) Field of Classification Search
CPC ........ C09K 8/74; C09K 8/54; C09K 2208/32; E21B 41/02; E21B 43/25
See application file for complete search history.

(56) References Cited

U.S. PATENT DOCUMENTS

| | | | |
|---|---|---|---|
| 8,584,757 B2 | 11/2013 | Reyes | |
| 8,906,199 B2 | 12/2014 | Giles et al. | |
| 9,512,348 B2 | 12/2016 | Reyes et al. | |
| 9,540,560 B2 | 1/2017 | Beuterbaugh et al. | |
| 9,587,171 B2 | 3/2017 | De Wolf et al. | |
| 2003/0104950 A1* | 6/2003 | Frenier | C11D 7/263 |
| | | | 507/200 |
| 2007/0213233 A1* | 9/2007 | Freeman | C09K 8/845 |
| | | | 507/261 |
| 2008/0035339 A1* | 2/2008 | Welton | C09K 8/524 |
| | | | 166/305.1 |
| 2013/0267446 A1 | 10/2013 | De Wolf et al. | |
| 2013/0274155 A1 | 10/2013 | Nasr-El-Din et al. | |
| 2014/0116707 A1* | 5/2014 | Sarda | C09K 8/74 |
| | | | 507/219 |
| 2017/0327735 A1* | 11/2017 | Belakshe | C09K 8/74 |

OTHER PUBLICATIONS

Mahmoud ; Removing of Formation Damage and Enhancement of Formation Productivity Using Environmentally Friendly Chemicals ; Texas A&M university Dissertation ; May 2011 ; 233 Pages.

* cited by examiner

*Primary Examiner* — Silvana C Runyan
(74) *Attorney, Agent, or Firm* — Oblon, McClelland, Maier & Neustadt, L.L.P.

(57) ABSTRACT

Well stimulating fluids and methods may use a first and a second chelating agent, e.g., diethylene triamine pentaacetic acid (DTPA), glutamic diacetic acid (GLDA), and/or hydroxyethyl ethylene diamine triacetic acid (HEDTA), particularly in amounts of from 1 to 10 wt. %, to control iron precipitation during the stimulation process. Such fluids can stabilize iron ions without precipitation to manage the efficiency and performance of the stimulation fluid. Such stimulation fluids can be used with for highly concentrated HCl solutions, e.g., more than 20 up to 28 wt. % or more, that are useful in emulsified acid formulations in acid fracturing or acidizing of carbonate formations.

19 Claims, 4 Drawing Sheets

IRON CONTROL COMPOSITION, MAKE, AND USE IN CARBONATE STIMULATION

BACKGROUND OF THE INVENTION

Field of the Invention

The present disclosure relates to an iron control method and wellbore stimulation formulation comprising a first and a second chelating agent, particularly, diethylenetriamine pentaacetic acid (DTPA), hydroxyethyl ethylenediamine triacetic acid (HEDTA), and/or glutamic acid N,N-diacetic acid (GLDA), and optionally further acetic acid and/or citric acid, preferably capable of maintaining 3000 ppm of ferrous and/or ferric ions in solution at pHs up to, e.g., 4.35 or more, without effecting the efficiency of the stimulation fluid formulation.

Description of the Related Art

Acid stimulation involves the treatment of a reservoir formation with a stimulation fluid containing a reactive acid. In sandstone formations the acid reacts with soluble substances in the formation matrix to enlarge pore spaces. In carbonate formations the acid dissolves the entire formation matrix. In each case the matrix acidizing treatment improves the formation permeability to enable enhanced production of reservoir fluids. Matrix acidizing operations are ideally performed at high rate, but at treatment pressures below the fracture pressure of the formation. This enables the acid to penetrate the formation and extend the depth of treatment while avoiding damage to the reservoir formation.

Acid stimulation can take the form of fracture acid stimulation or matrix acid stimulation. Fracture acidizing works above the fracturing pressure of the reservoir rock which can create long, open channels from the wellbore penetrating deep into the formation. Matrix acid stimulation works at or below the fracturing pressure and is useful for stimulating sandstone and carbonate reservoirs. The acids for carbonate formations vary from those used to treat sandstone, in that HCl, acetic acid, formic acid, and the like are typically used for carbonates and weaker acids, including HF, $NH_4HF_2$, or HF/HC are used for sandstone.

Controlling iron during acid stimulation is one of most complicated problems in the oil and gas industry, at least in part because ferric ions, i.e., $Fe^{3+}$, are prone to precipitate during acid stimulation. Ferric ion complexation and/or salt precipitation has an adverse impact on the performance of the injected acid. The presence of ferric ions in acid stimulation solutions can degrade the output yield and/or efficiency of the production well and diminish the input capacity and/or efficiency of the injection wells. The precipitation of the ferric ions generally depends on the concentration of iron in the stimulation formulation. Fracturing and acidizing fluids are usually high concentration acids. The problem becomes more severe with increasingly aggressive stimulation environments such as those encountered when subjecting the equipment and the formation to concentrated acid, e.g., 28 wt. % HCl.

Existing ion control systems can control iron precipitation using up to 20 wt. % HCl. Although adding corrosion inhibitors to the stimulation fluid can mitigate the acidic or other corrosion of the pipe, corrosion inhibitors are insufficient to prevent corrosion by aggressive acid(s). Including corrosion inhibitors in the stimulation fluids can also increase costs and/or diminish the efficiency of the treatments. Another drawback of adding corrosion inhibitors to the stimulation fluids is the possibility of changing the wettability of the reservoir rocks due to absorption of the corrosion inhibitors. This may cause contamination, including ferric ions, to flow with acid to the formation. As acid in the stimulation fluid is neutralized/spent in the formation, the pH of the stimulation fluid and the local environment may increase such that ferric irons precipitate. As the pH reaches 3.5 the iron, or at least the $Fe^{3+}$, can completely precipitate.

Balancing between, e.g., acid strength, acid concentration, pH, precipitation risks, costs, and production efficiency, the development of a stimulation fluid formulation is needed to reduce damage caused by iron precipitation. Certain research has aimed at reducing the amounts of ferric compounds in stimulation fluids before introducing the stimulation fluids into formations to thereby reduce or eliminate the precipitation of iron. Chelating agents have been considered amongst the most effective iron control agents that can be added to the HCl during stimulation operations. Field and laboratory results have shown that chelating agents can control the amount of iron in spent stimulation fluids The challenges in managing iron during the stimulation of oil and gas well with high concentration fluid are complex. A variety of the efforts have been made to solve problems of the art.

US 2013/0274155 A1 by Nasr-El-Din et al. (Nasr-El-Din) discloses a process to control iron in a subterranean formation by introducing a fluid containing glutamic acid N,N-diacetic acid or salt (GLDA) and/or methylglycine N,N-diacetic acid or salt (MGDA), preferably 0.1 to 30, 5 to 30, or 10 to 20 wt. % based of total fluid weight, into the formation at a temperature between 77 and 400° F. (~2 and 204° C.), and treating a subterranean formation while simultaneously controlling iron. Nasr-El-Din's fluid preferably contains an acid, preferably an inorganic acid, to assist in treating the formation, such as HCl or HF, which is suitably is used in an amount of between 3 and 28 wt % on the basis of the total weight of the fluid. However, Nasr-El-Din does not teach combining two of its chelators, but instead that one of the two would function similarly. Additionally, Nasr-El-Din exemplifies only 5 or 15 wt. % HCl in its fluid, as well as 5 or 10 wt. % GLDA.

US 2013/0267446 A1 by de Wolf et al. (de Wolf I) discloses treating sandstone or illite formations by introducing a fluid containing glutamic acid N,N-diacetic acid or salt (GLDA) and/or methylglycine N,N-diacetic acid or salt (MGDA) and having a pH of 1 to 14 into the formation. Wolf I's fluid has 5 to 30 wt % GLDA and/or MGDA, a corrosion inhibitor, a surfactant, and a mutual solvent. Wolf I discloses that problems are caused by the interaction of the (usually concentrated, 20 to 28%) stimulation acid and certain crude oils (e.g. asphaltic oils) in the formation to form sludge. Wolf I's composition may comprise HCl, but beyond indicating problems from 20 wt. % or more HCl, Wolf only appears to teach HCl in at most 15 wt. %. Moreover, while Wolf I may allow combinations of chelators as acid generators, Wolf I exemplifies using only singular chelators in its fluids.

U.S. Pat. No. 9,540,560 to Beuterbaugh et al. (Beuterbaugh) discloses acidizing subterranean carbonate formations with a fluid comprising an aqueous carrier fluid, an acid, and a chelating agent comprising N-(phosphonomethyl)-iminodiacetic acid (NPIDA), the fluid having a pH (i) at or below NPIDA-protonation pH and (ii) at which the chelating agent is ineffective for complexing a metal ion, thereby at least partially spending the acid and complexing a metal ion with the chelating agent. Beuterbaugh's chelating agent may range from 0.1, 0.5, 1, 5, or 10 wt. % and 40, 25, 10, or 5 wt. % of the treatment fluid, and may comprise, in addition to NPIDA, a large variety of compounds including hydroxyethyl ethylenediamine triacetic acid (HEDTA) and GLDA. Beuterbaugh describes a broad group of acid or acid-generating compounds including HCl, in an amount of 1, 5, or 10 wt. % to 70, 50, 20, 15, 10, or 5 wt. %. Beuterbaugh does not, however, describe using HCl particularly, nor in combination with two or more particular complexing agents.

U.S. Pat. No. 9,512,348 to Reyes et al. (Reyes I) discloses servicing a wellbore in a subterranean formation with a wellbore servicing fluid (WSF) comprising an amino multicarboxylic acid chelating agent, a pH adjusting compound, and an aqueous base fluid. Reyes I's WSF contacts scale deposits on a surface in fluid communication with the wellbore and/or subterranean formation, and Reyes I's chelating agent comprises tertiary amine ethylenic ether alkylcarboxylates. Reyes I's chelating agent(s) may include GLDA, DTPA, and/or MGDA, among many other compounds. Reyes I does not disclose using any particular concentration of HCl, particularly not above 15 wt. % HCl, instead describing 7% HF. In addition, Reyes I does not exemplify combining two of GLDA, DTPA, or MGDA, instead using only methylglycine diacetic acid (MGDA) in at least 16 wt. %.

U.S. Pat. No. 8,584,757 to Reyes (Reyes II) discloses methods and compositions for producing or recovering an aqueous-based fluid to be utilized or injected in a wellbore or surrounding subterranean formation. Reyes II contacts the aq. fluid with an aq.-soluble composition of an oxidizing agent and a catalyst to produce a treated aqueous-based fluid suitable for use or injection in a wellbore or surrounding subterranean formation. Reyes II uses a multi-amide complexing agent, and may use a variety of additional chelating agents, including HEDTA, GLDA, or DTPA. Reyes II does not disclose using concentrated HCl, nor any particular combinations of chelating agents.

U.S. Pat. No. 9,587,171 to de Wolf et al. (de Wolf II) discloses treating a subterranean formation, esp. sandstone, with a fluid containing an ammonium salt of GLDA and/or MGDA (up to 50, 5 to 40, or 10 to 20 wt. %) and further additives. Wolf II describes using HCl as a pH control additive, but describes problems with HCl in amounts of 20 wt. % or more. Wolf II describes several further optional chelators, including HEDTA and DTPA, but does not exemplify combinations of chelating agents.

U.S. Pat. No. 8,906,199 to Giles et al. (Giles) discloses a process for bleaching wood pulp using peroxide oxidizing agent(s) by treating the pulp with a mixture of chelating agents. Giles's formulation uses (a) a first chelating agent of ethylenediamine N,N-disuccinic acid, MGDA, GLDA, and/or imino disuccinic acid; and (b) a second chelating agent of: DTPA, EDTA, and/or diethylenetriamine penta methylene phosphonic acid. Giles discloses neither HCl stimulating fluids for oil wells, nor a specific combination of chelating agents, e.g., GLDA, DTPA, and/or HEDTA.

The doctoral thesis entitled "Removing of Formation Damage and Enhancement of Formation Productivity Using Environmentally Friendly Chemicals" from May, 2011, at Texas A&M University by Mohamed A. N. E. Mahmoud (Mahmoud) discloses matrix acidizing using HCl, organic acids, or mixtures thereof in carbonate formations to create wormholes that connect the formation to the wellbore. Mahmound describes drawbacks such as corrosion and uncontrolled reaction rates in matrix acidizing, and particularly HCl causing face dissolution and decomposition of clays, and that using chelating agents addresses such problems. Mahmoud states that chelating agents have limited dissolving power and negative environmental impact. Mahmoud describes using GLDA, EDTA, HEDTA, at 0.6 M concentration to stimulate carbonate cores (calcite and dolomite) at temperatures of from 180 to 300° F. (82.2 to 148.9° C.) and pHs of from 1.7 to 13. While Mahmoud compares GLDA to EDTA, HEDTA, and hydroxyethyliminodiacetic acid (HEIDA), Mahmoud does not disclose combining chelating agents, nor using concentrations of HCl beyond 15 wt. %.

The master thesis entitled "Dissolution of Barite Scale Using Chelating Agents" from May, 2012, at Texas A&M University by Aniket V. Shende (Shende) describes using DTPA to address $BaSO_4$ scaling, which scaling causes oilfield problems leading to loss of well productivity and well abandonment. Shende does not mention HCl, beyond stating that $BaSO_4$ is insoluble in it. Shende discloses combinations of EDTA and DTPA, DTPA and MGDA, and DTPA and GLDA, but teaches that combining DTPA with weaker chelating agents like EDTA, GLDA, or MGDA reduces barite dissolution and should be avoided during treatment design. Shende's formulation also includes oxalic acid, and potassium hydroxide, but not using HCl, particularly not in high concentrations.

The master thesis entitled "Identifying Optimum Conditions for Stable Wormholes Created by Chelating Agents" from May, 2015, at King Fand University of Petroleum & Minerals by Assad A. A. Barri (Barri) describes acidizing carbonate formations (to reduce the formation damage near the wellbore) using chelating agents, such as EDTA, GLDA, DTPA, and HEDTA, to find optimum pH and concentration values. Barri found 5% DTPA and HEDTA to be good iron control agents for 20 wt. % HCl, with solutions having 15 wt. % chelators in 15 wt. % HCl having no precipitation. Barri discloses mixtures of HEDTA and GLDA in up to 28 wt. % HCl in deionized water, showing exponential solubility decay with increasing HCl concentration, but a combined solubility of 10 wt. % in 20 wt. % HCl at 72° C. (22.2° C.). Barri describes that 5% of HEDTA and DTPA chelating agents kept 3000 ppm of ferric ions in solution up to a pH 4.35, but that GLDA can only stabilize ferric ions at pHs less than 3.0. Barri also discloses 20 or 28 wt. % HCl solutions of HEDTA (0.25, 0.75, or 5.0 wt. %), GLDA (0.25, 0.75, or 2.5 wt. %), and 2.5 wt. % acetic acid and/or 2.5 wt. % citric acid (1.5 wt. % AA/1.0 wt. % CA). However, Barri teaches that none of none of EDTA, GLDA, DTPA, and HEDTA were soluble in 28 wt. % HCl, and none except DTPA (2.5 wt. %) was soluble at HCl concentrations higher than 20 wt. %, while there were no solubility issues for 15 wt. % HCl. Barri does not indicate that combinations of chelators are capable to function with HCl concentrations greater than 20 wt. %.

A need thus exists for an iron control system that can stabilize ferric ions without precipitation preferably with HCl concentrations greater than 15, 20, or 22 wt. %, maintain efficiency of the stimulation fluid, and/or prevent blockage of the pores of the formation. The formulation should ideally keep the ferric ions in the solution as the pH rises to overcome precipitation of the iron flowing with the acid as the acid becomes spent in the formation. Methods of using and making such formulations are also sought.

SUMMARY OF THE INVENTION

Aspects of the invention provide well stimulation fluids, which may comprise: greater than 20 to 34 wt. % HCl, relative to the total stimulation fluid weight; 1 to 5 vol. % of a corrosion inhibitor, relative to the total stimulation fluid volume; 1 to 5 wt. %, relative to the total stimulation fluid weight, of a first chelating agent having a formula (I)

(I)

and 1 to 5 wt. %, relative to the total stimulation fluid weight, of a second chelating agent having a formula (II) or (III)

(II)

(III)

wherein, in formulas (I), (II), and (III), R is independently H or a counterion, a, d, e, f, and g are independently 1, 2, or 3, b and c are independently 1, 2, 3, or 4, h is 1, 2, 3, 4, or 5, and x is 0 or 1. Such a formulation may be modified by any permutation of the features described herein, particularly the following.

The HCl may be present in a concentration of at least 22 wt. %, relative to the total stimulation fluid weight.

Inventive fluids may comprise diethylenetriamine pentaacetic acid as the first chelating agent. Inventive fluids may comprise hydroxyethyl ethylenediamine triacetic acid as the second chelating agent. Inventive fluids may comprise glutamic diacetic acid as the second chelating agent. Inventive fluids may comprise diethylenetriamine pentaacetic acid as the first chelating agent and glutamic diacetic acid as the second chelating agent.

Inventive fluids may be suitable to maintain up to 3000 ppm iron ions in the fluid solubilized for at least 3 days, and/or the iron ions remain solubilized up to a pH of 4.

The first and/or second chelating agent may be present in an amount of from 1.5 to 3.5 wt. %, or 2 to 2.5 wt. %, relative to the total stimulation fluid weight.

Aspects of the invention include methods of stimulating a well, with any permutation of the stimulation fluid described herein. Such methods may comprise injecting an oil or gas well with a stimulation fluid which may comprise: at least 20 wt. % HCl, relative to the total stimulation fluid weight; 1 to 5 vol. % corrosion inhibitor, relative to the total stimulation fluid volume; 1 to 10 wt. %, relative to the total stimulation fluid weight, chelating agent comprising at least two compounds of a formula (I), (II), or (III)

(I)

(II)

(III)

wherein, in formulas (I), (II), and (III), R is independently H or a counterion, a, d, e, f, and g are independently 1, 2, or 3, b and c are independently 1, 2, 3, or 4, h is 1, 2, 3, 4, or 5, and x is 0 or 1, to thereby prevent precipitation of at least 1000 ppm iron ions while stimulating the well.

The chelating agent may comprise a first compound of formula (I) and a second compound of (II), wherein R is H, a, d, e, f, and g are each 1, b and c are independently 2 or 3, and x is 1. The chelating agent may comprise a first compound of formula (I) and a second compound of (II), wherein R is H, a, d, e, f, and g are each 1, and b and c are each 2, and h is 1 or 2.

The chelating agent may comprise diethylene triamine pentaacetic acid and glutamic diacetic acid. The stimulation fluid may comprise 2.0 to 2.5 wt. % of diethylene triamine pentaacetic acid and 2.0 to 2.5 wt. % of glutamic diacetic acid, each relative to the total stimulation fluid weight.

The stimulation fluid may prevent precipitation of at least 2500 ppm iron ions.

The corrosion inhibitor may be present in the stimulation fluid in an amount of from 2.5 to 3.5 vol. %, relative to the total stimulation fluid volume.

The well may be in a carbonate formation. The well may be an oil well.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Aspects of the invention provide well stimulation fluids, which may comprise: greater than 20 to 34 wt. % HCl, relative to the total stimulation fluid weight, e.g., at least 21, 22, 23, 24, 25, 26, 27, or 28 wt. % and/or up to 33, 32, 31, 30, 29, 28, or 27 wt. % HCl; 1 to 5, 1.25 to 4.5, 1.5 to 4, 1.75 to 3.5, 2 to 3.25, or 2.5 to 3 vol. % of a corrosion inhibitor, relative to the total stimulation fluid volume; 1 to 5 wt. %, e.g., at least 1.25, 1.5, 1.75, 2, 2.25, 2.5, 2.75, or 3 wt. % and/or up to 4.75, 4.5, 4.25, 4, 3.75, 3.5, 3.25, 3, 2.75, 2.5, 2.25 or 2 wt. %, relative to the total stimulation fluid weight, of a first chelating agent having a formula (I)

(I)

and
1 to 5 wt. %, e.g., independently from the first chelating agent, and of these end points and/or at least 1.25, 1.5, 1.75, 2, 2.25, 2.5, 2.75, or 3 wt. % and/or up to 4.75, 4.5, 4.25, 4, 3.75, 3.5, 3.25, 3, 2.75, 2.5, 2.25 or 2 wt. %, relative to the total stimulation fluid weight, of a second chelating agent having a formula (II) or (III)

(II)

(III)

wherein, in formulas (I), (II), and (III), R is independently H or a counter ion, a, d, e, f, and g are independently 1, 2, or 3, b and c are independently 1, 2, 3, or 4, h is 1, 2, 3, 4, or 5, and x is 0 or 1. The carboxylate elements on inventive chelating agent amine nitrogens may be acetic, propionic, butyric acid moieties and linkages between amine nitrogens may be ethylene, propylene, butylenes, or the like, basically to achieve desired iron ion solubility or fluidity. Solubilized herein is meant to cover non-precipitated forms of iron in solution or otherwise remaining fluid, such as a non-solid flocculent or other pseudo-dissolve morphology insufficient to block pores and/or wormholes, whether technically dissolved or not, in the stimulation fluid. The carbon chains on the any of the above chelating agents may be be substituted with 1, 2, 3, 4, or 5 moieties which generally do not counteract the solubilizing effect (or compensate in some other manner), such as F, Cl, methyl, ethyl, nitro, amide, amines, carboxylates, —$OCH_3$, —$OCH_2CH_3$, or the like.

Inventive fluids may comprise diethylenetriamine pentaacetic acid, diethylenetriamine pentapropionic acid, dipropylenetriamine pentapropionic acid, and/or dipropylenetriamine pentaacetic acid as the first chelating agent. Inventive fluids may comprise hydroxyethyl (or hydroxypropyl, hydroxybutyl, or hydroxypntyl) ethylenediamine (or propylenediamine or butylenediamine) triacetic (or tripropionic) acid as the second chelating agent. Inventive fluids may comprise glutamic (or aspartic) diacetic (or dipropionic) acid as the second chelating agent. Inventive fluids may comprise diethylenetriamine pentaacetic acid as the first chelating agent and glutamic diacetic acid as the second chelating agent.

Inventive fluids may be suitable to maintain up to 2000, 2250, 2500, 2750, 3000, 3025, 3050, 3075, 3100, 3125, 3150, 3175, 3200, 3225, 3250, 3275, 3300, 3325, 3350, 3375 ppm iron ions in the fluid solubilized for at least 3, 3.5, 4, 4.5, 5, 7, or 10 days, and/or the iron ions remain solubilized up to a pH of 3.5, 3.6, 3.7, 3.8, 3.9, 4, 4.05, 4.1, 4.15, 4.2, 4.25, 4.3, 4.35, 4.4, 4.45, 4.5, 4.55, 4.6, 4.65, or more.

The first and/or second chelating agent may be present in an amount of from 1.5 to 3.5, 1.75 to 3.25, 1.85 to 3, 1.95 to 2.75, 2 to 2.5, 2.2 to 2.4 wt. %, or some combination of these endpoints with any of those above, relative to the total stimulation fluid weight.

Aspects of the invention include methods of stimulating a well, with any permutation of the stimulation fluid described herein. Such methods may comprise injecting an oil or gas well with a stimulation fluid which may comprise: at least or more than 20, 21, 22, 23, 24, 25, 26, 27, 27.5, 28, 28.5, or 29 wt. % HCl, relative to the total stimulation fluid weight; 1 to 5, 1.25 to 4.5, 1.5 to 4, 1.75 to 3.5, 2 to 3.25, or 2.5 to 3 vol. % corrosion inhibitor, relative to the total stimulation fluid volume; 1 to 10 wt. %, e.g., at least 1.1, 1.25, 1.33, 1.5, 1.75, 2, 2.125, 2.25, 2.375, 2.5, 2.625, 2.75, 2.875, 3, 3.25, 3.5, 3.75, 4, 4.25, 4.5, 4.75, 5, or 5.5 wt % and/or up to 9, 8, 7, 6.5, 6.25, 6, 5.75, 5.5, 5.25, 5, 4.875, 4.75, 4.625, 4.5, 4.375, or 4.25 wt. % (or some combination of these or the endpoints above) relative to the total stimulation fluid weight, of a chelating agent comprising at least two compounds of a formula (I), (II), or (III)

(I)

-continued wherein, in formulas (I), (II), and (III), R is independently H or a counter ion, a, d, e, f, and g are independently 1, 2, or 3, b and c are independently 1, 2, 3, or 4, h is 1, 2, 3, 4, or 5, and x is 0 or 1, to thereby prevent precipitation of at least 1000, 1500, 1750, 2000, 2250, 2500, 2750, 3000, 3100, 3200, 3300, 3400, or 3500 ppm iron ions (or any of those amounts discussed above) while stimulating the well.

In addition to any of the chelating agents covered by the formulas above, the chelating agent may comprise a first compound of formula (I) and a second compound of (II), wherein R is H, a, d, e, f, and g are each 1, b and c are independently 2 or 3, and x is 1. The chelating agent may comprise a first compound of formula (I) and a second compound of (II), wherein R is H, a, d, e, f, and g are each 1, and b and c are each 2, and h is 1 or 2. Such chelating agents may be used in the inventive fluids generally, independent of the method.

The chelating agent may comprise diethylene triamine pentaacetic acid and glutamic diacetic acid. The stimulation fluid may comprise 2.0 to 2.5 wt. %, e.g., at least 2.05, 2.1, 2.15, 2.2, 2.25, 2.3, 2.35, 2.4, or 2.45 wt. % and/or up to 2.7, 2.65, 2.6, 2.55, 2.5, or 2.45 wt. %, of diethylene triamine pentaacetic acid and 2.0 to 2.5 wt. %, e.g., independently at least 2.05, 2.1, 2.15, 2.2, 2.25, 2.3, 2.35, 2.4, or 2.45 wt. % and/or up to 2.7, 2.65, 2.6, 2.55, 2.5, or 2.45 wt. %, of glutamic diacetic acid, each relative to the total stimulation fluid weight.

The stimulation fluid may prevent precipitation of at least 2500, 2550, 2600, 2650, 2700, 2750, 2800, 2850, 2900, 2950, 2975, 3000, 3025, 3050, or more ppm iron ions, particularly at temperatures of at least 10, 15, 17.5, 20, 22.5, 25, or 30° C. and/or up to 70, 60, 55, 50, 45, 40, 35, or 30° C. The corrosion inhibitor may be present in the stimulation fluid in an amount of from 2.5 to 3.5, 2.75 to 3.25, 2.85 to 3.15, 2.9 to 3.1, 2.95 to 3.05, or 3 vol. %, relative to the total stimulation fluid volume. Inventive fluids may further comprise brine and/or salts, such as salts comprising cations of $Na^+$, $K^+$, $Li^+$, $Cs^+$, $Mg^{2+}$, $Ca^{2+}$, $Sr^{2+}$, and/or $Ba^{2+}$ and/or anions such as $Cl^-$, $Br^-$, $I^-$, $NO_3^-$, $ClO_2^-$, $ClO_3^-$, $ClO_4^-$, $BrO_4^-$, $BrO_3^-$, $IO_4^-$, $IO_3^-$, $MnO_4^-$, $FeO_4^{2-}$, $CO_3^{2-}$, $SO_4^{2-}$, $PO_4^{3-}$, $BO_3^{3-}$, $BF_4^-$, and/or $F^-$.

The well may be in a carbonate formation, though it may also be sandstone, or other geological formations, e.g., limestone, dolomite, illite, etc. The well may preferably be an oil well, which may be on land or off shore.

Further examples of suitable chelating agents may include, but are not limited to: hexamethylene diamine tetra methyl-phosphonic, Schiff bases of 2-({-1-methyl-3-[(2-sulfanylphenyl)imino]butylidene}-amino)-1-benzenethiol and 2-({-1,2-diphenyl-2-[(2-sulfanylphenyl)imino] ethylidene}amino)-1-benzenthiol, hexahydro-1,3,5-triphenyl-s-triazine (Inh-1), hexahydro-1,3,5-p-tolyl-s-triazine (Inh-2), hexahydro-1,3,5-p-methoxyphenyl-s-triazine (Inh-3), hexahydro-1,3,5-p-aminophenyl-striazine (Inh-4), hexahydro-1,3,5-p-nitrophenyl-s-triazine (Inh-5)], citric acid, nitrilotriacetic acid (NTA), propylene diamine tetraacetic acid (PDTA), ethylene diamine-N,N'-di(hydroxyphenylacetic) acid (EDDHA), ethylene diamine-N,N'-di-(hydroxy-methylphenyl acetic acid (EDDHMA), ethanol diglycine (EDG), trans-1,2-cyclohexylene dinitrilotetraacetic acid (CDTA), glucoheptonic acid, gluconic acid, sodium citrate, phosphonic acid, salts thereof, and the like. For certain applications, any of these may be excluded or largely excluded from the stimulation fluid, e.g., no more than 25, 20, 15, 10, 5, 4, 3, 2, 1, 0.5, 0.1, 0.001, or 0.0001 wt. % or no more than trace detectable amounts of one, any, or all of these, relative to the total stimulation fluid weight.

Useful corrosion inhibitors may be of ammonia, primary, secondary, or tertiary amines, quaternary ammonium compounds, and/or sulfur compounds, such as diethyl thiourea (DETU), alkyl pyridinium or quinolinium salt, such as dodecyl pyridinium bromide (DDPB), and sulfur compounds, such as thiourea or ammonium thiocyanate, benzotriazole (BZT), benzimidazole (BZI), dibutyl thiourea, an inhibitor called TIA, alkyl pyridines, bis-quaternary ammonium compounds (BQA); unsaturated carbonyl compounds, 1-phenyl-1-ene-3-butanone, cinnamaldehyde; unsaturated ether compounds, 1-phenyl-3-methoxy-1-propene; unsaturated alcohols, acetylenic alcohols, methyl butynol, methyl pentynol, hexynol, ethyl octynol, propargyl alcohol, benzylbutynol, ethynylcyclohexanol; Mannich condensation products (such as those formed by reacting an aldehyde, a carbonyl containing compound and a nitrogen containing compound); condensation products formed by reacting an aldehyde in the presence of an amide; polysaccharides, inulin, tannins, tannic acid, catechin, epicatechin, epigallocatechin, epicatechingallate; formamide, formic acid, formates; other sources of carbonyl; iodides; fluorinated surfactants; quaternary derivatives of heterocyclic nitrogen bases; quaternary derivatives of halomethylated aromatic compounds; terpenes; aromatic hydrocarbons, gelatin; derivatives thereof, and the like, or combinations thereof. Further trademarked examples may be CONQOR 404, CONQOR 404 EH, CONQOR 404 WH, CONQOR 303A, CONQOR 202B, SULFATREAT DFS, OS-1L, and/or SULFATREAT XLP, corrosion inhibitors from Schlumberger. Further examples may be found in US 2016/0130494 A1, U.S. Pat. Nos. 6,866,797, 3,645,896, 3,932,296, 3,982,894, 3,974,220, 4,655,287, 4,664,193, 5,565,416, and 5,759,485, each of which are incorporated by reference in their entirety.

Aspects of the invention provide formulations that can control the iron in stimulation fluids and keep the iron dissolved and/or fluid in the solution during the acid stimulation process. For example, inventive formulations may maintain least 75, 80, 85, 90, 92.5, 95, 97.5, 98, 99, 99.1, 99.5, 99.9% or more of the original stimulation fluid viscosity after passage through 50, 65, 75, 85, 90, 95, 99% or more of the destination distance and/or exit and/or attaining a pH of at least 3, 3.25, 3.5, 3.75, or 4.

Aspects of the invention include formulations comprising 5 wt. % of diethylene-triamine pentaacetic acid (DTPA, below left), glutamic diacetic acid (GLDA, below middle, in ionic form), and/or hydroxyethyl ethylene-diamine triacetic acid (HEDTA, below right):

or mixtures thereof, wherein R is independently H or a counter ion, such as $Na^+$, $K^+$, $Li^+$, $NH_4^+$, $Mg^{2+}$, etc., a, d, e, f, and g are independently 1, 2, or 3, b and c are independently 1, 2, 3, or 4, h is 1, 2, 3, 4, or 5, and x is 0 or 1. Inventive fluids and/or methods may use only 2, or at least 2, 3, 4, 5, 6 or more compounds in the chelating agent(s).

Each, both or all of the chelating agents may be in a range of from 1 to 10, 1 to 5, 1.5 to 4, 1.75 to 3, or 2 to 2.5 wt. %, e.g., any of these endpoints and/or at least 0.75, 0.9, 1.1, 1.25, 1.33, 1.4, 1.6, 1.8, 1.9, 2.1, 2.15, 2.25, 2.33, 2.4, 2.5, or 2.6 wt. % and/or up to 9, 8, 7.5, 7, 6, 5.5, 5.25, 4.75, 4.5, 4.25, 3.75, 3.5, 3.25, 3.1, 2.9, 2.75, 2.6, 2.4, or 2.25 wt. %. The chelating agents may include diethylenetriamine pentaacetic acid (DTPA) and glutamic acid N,N-diacetic acid (GLDA), each preferably at 2.5±0.05, 0.1, 0.15, 0.2, 0.25, 0.3, 0.33, 0.4, 0.45, or 0.5 wt. %, optionally in 28±1, 2.5, 5, 7.5 wt. % HCl. Inventive stimulation fluids may prevent the ferric ions from precipitation. Inventive stimulation fluids may solubilize, i.e., maintain in fluid phase, up to 3000 ppm of ferric ions in the fluid. Inventive stimulation fluids may prevent iron precipitation for pHs up to 4.3. Inventive stimulation fluids may be used with high HCl concentration formulations, such those between 20 and 28 wt. % HCl.

Inventive formulations using around 20 wt. % HCl, and comprising 5 wt. % of either diethylenetriamine pentaacetic acid (DTPA), glutamic acid N,N-diacetic acid (GLDA), or hydroxyethyl ethylenediamine triacetic acid (HEDTA). Such formulations can likewise solubilize, i.e., maintain in fluid phase, up to 3000 ppm of ferric ions in the fluid. Inventive stimulation fluids may prevent iron precipitation for pHs up to 4.5.

at a pH of at least 2, 2.5, 3, 3.25, 3.5, 3.75, 4, 4.25, 4.5, 4.75, 5, 5.25, 5.5, 5.75, 6, 6.25, 6.5, 6.75, 7, or more. Inventive formulations may be able to sustain 3000 ppm of the ferric ions at 72° F. (22.2° C.), without precipitation of iron, and/or may sustain the iron in solution at pH up to 3.5, 4, 4.5, 5, 5.5, or more without precipitation. Inventive formulations may have the capability to work up to HCl concentrations of 15, 17.5, 20, 22.5, 25, 27.5, 28, 29, or 30 wt. %, and/or with no more than 50, 40, 33.3, 30, 27.5, 22.5, 16.6, 12.5, 10, 7.5, 5, or 2.5 atom. % iron precipitation.

Stimulation fluids with HCl concentrations of up to 20, 22, 24, 26, 27, 28, 29 wt. %, or more, while combining two chelating agents, e.g., DTPA, GLDA, and/or HEDTA at 2.5 wt. %, and/or any of these in any combination of at least 0.5, 0.75, 1, 1.25, 1.5, 1.75, 2, 2.25, 2.5, 2.75, or 3 wt. % and/or up to 4.5, 4.25, 4, 3.75, 3.5, 3.25, 3, 2.75, 2.5, 2.25 wt. %. Inventive formulations may maintain ferric ions of at least 2000, 2250, 2500, 2750, 2800, 2850, 2900, 2950, 3000, 3050, or 3100 and/or up to 2500, 2750, 2800, 2850, 2900, 2950, 3000, 3050, 3100, 3150, 3200, 3250, 3300, 3350, 3400, 3450, 3500 ppm in solution without precipitation. Inventive formulations may keep the iron ions in solution at solution pH values of up to 4.0, 4.1, 4.2, 4.25, 4.3, 4.35, 4.4, 4.45, 4.5, 4.55, 4.6, 4.65, 4.7, or 4.75.

Aspects of the invention provide iron control systems which can solubilize iron in stimulating fluids using HCl concentrations of at least or more than 20, 21, 22, 23, 24, 26, 27, 28, 29, 30, 31, 32, 33, or 34 wt. %, using a combination comprising a first and a second chelating agent. The first and second chelating agents may comprise:

EXAMPLES

The performance of the inventive formulations for iron control in concentrated HCl using a solubility test was conducted at 72° F. (22.2° C.). The solubility test was conducted at varying HCl and chelating agent concentrations. During the solubility test the concentration of HCl was set to either 20 wt. % (low) or 28 wt. % (high) concentration.

Three different exemplary chelating agent types (DTPA, GLDA, and HEDTA) were used to validate and develop optimum formulation. Each chelating agent was used alone with varied concentrations ranging from 1 to 10 wt %.

To the evaluate the capability of the generated formulation to sustain the iron in the solution without precipitation, 3000 ppm of iron was dissolved in the respective formulations, and, after that, the stability of the formulation as function of time was evaluated.

Figure 1:
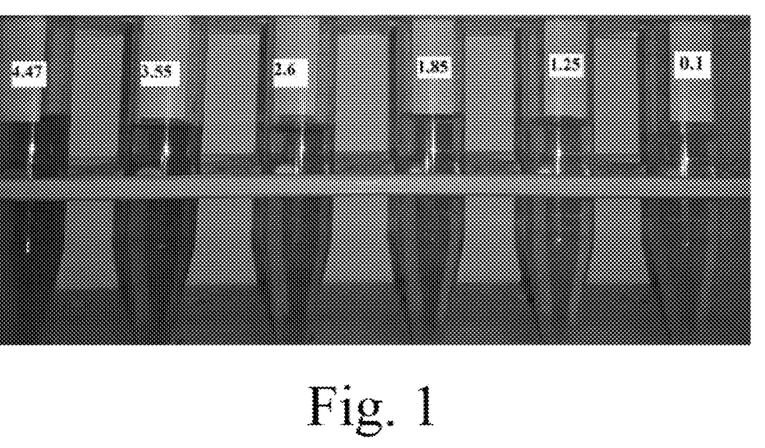
FIG. 1 shows images of test tubes with 5% diethylenetriamine pentaacetic acid (DTPA)/20% HCl formulations after adding 3000 ppm ferric ions at different pH at temperature of 72° F. (22.2° C.)
Figure 2:
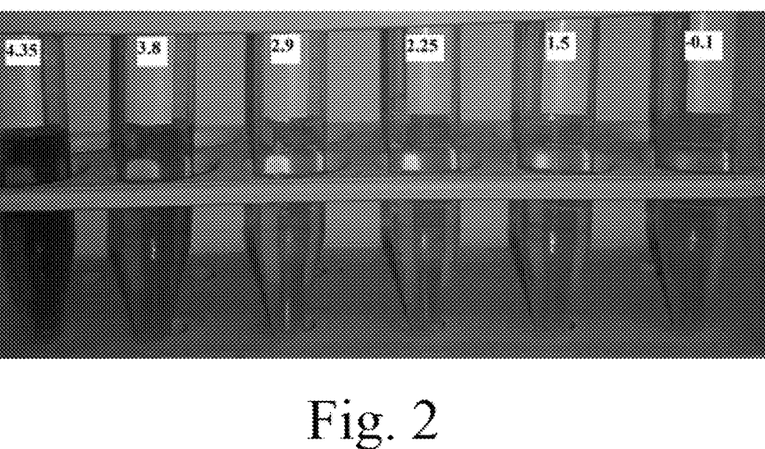
FIG. 2 shows images of test tubes with 5% hydroxyethyl ethylenediamine triacetic acid (HEDTA)/20% HCl formulations after adding 3000 ppm ferric ions at different pH at temperature of 72° F. (22.2° C.)
Figure 3:
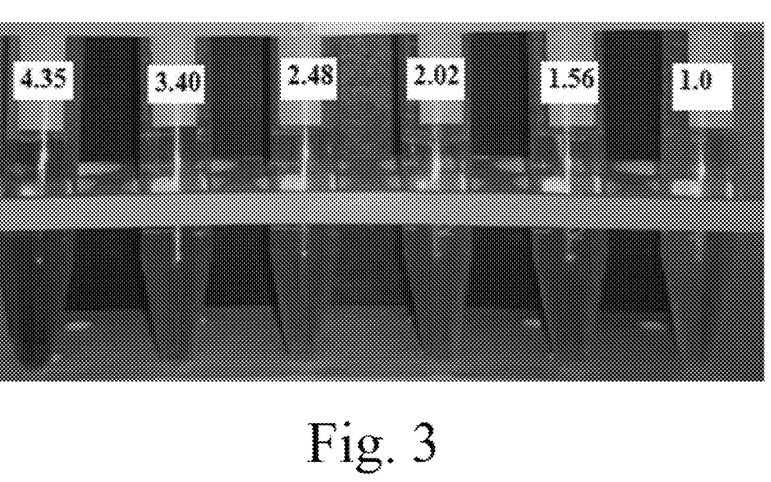
FIG. 3 shows images of test tubes with 5% glutamic acid N,N-diacetic acid (GLDA)/20% HCl formulations after adding 3000 ppm ferric ions at different pH at temperature of 72° F. (22.2° C.)
Figure 4:
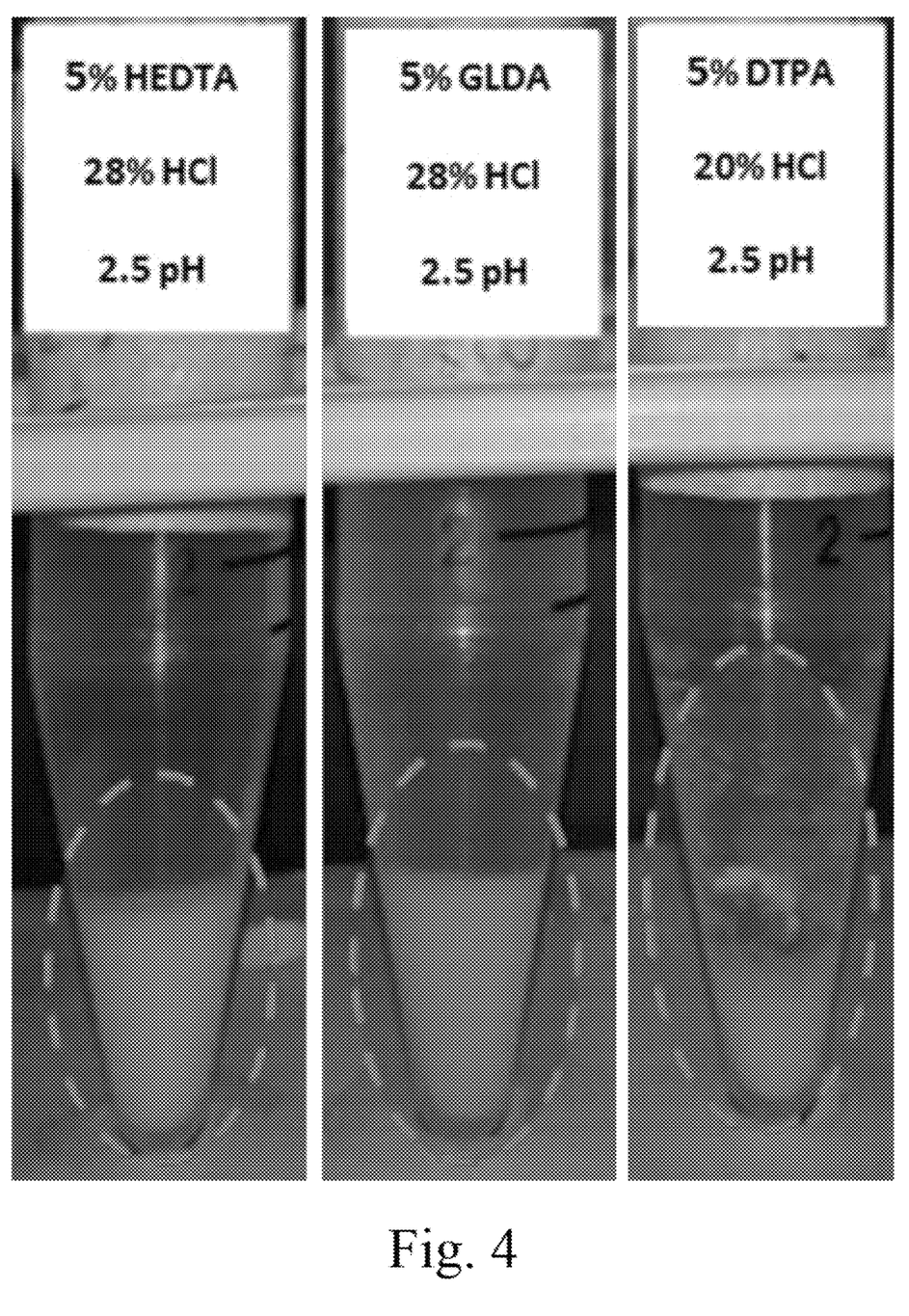
FIG. 4 images of test tubes with shows 5% DTPA, 5% GLDA, 5% HEDTA with 28% HCl formulations after adding 3000 ppm ferric ions at temperature of 72° F. (22.2° C.)

The experimental results shown in FIGS. 1 to 3 show that 5 wt. % formulations comprising single chelating agents, i.e., DTPA, HEDTA, and GLDA, could manage to maintain 3000 ppm of iron in the solution at HCl concentrations up to 20 wt. %. The stability of these solutions was evaluated for 96 hours and no precipitation was noticed. As seen in FIG. 4, for 28 wt. % HCl stimulation fluids, there was precipitation.

Figure 5:
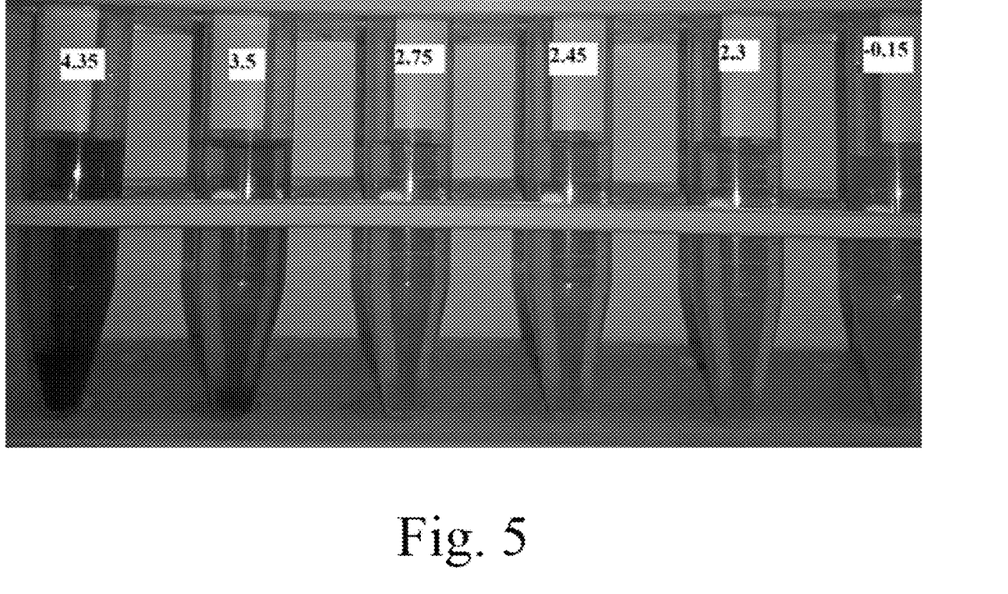
FIG. 5 images of test tubes with shows 2.5% DTPA plus 2.5% GLDA/28% HCl formulations after adding 3000 ppm ferric ions at different pH at temperature of 72° F. (22.2° C.)

For 28 wt. % HCl, a single chelating agent solution was poor at, insufficiently capable, or incapable of sustaining 3000 ppm of iron in the solution. Therefore, different combinations of the exemplary chelating agents were attempted. As shown in FIG. 5, a formulation comprising DTPA and GLDA was determined to be capable of maintaining 3000 ppm of iron in the solution without precipitation. The combined formulation was stable for long periods, e.g., at least 96 hours with no precipitation, for example, at least 3, 4, 5, 6, or 7 days, and/or up to 8, 7, 6, 4, 3, or 2 weeks.

The effect of the pH on the performance of exemplary inventive formulations was evaluated by repeating the solubility and stability tests at varied pH values. A maximum pH value recorded was 4.35 for the formulation in FIG. 5, at which the formulation was stable for 96 hours without precipitating the iron.

Coreflooding Experiments

Figure 6A:
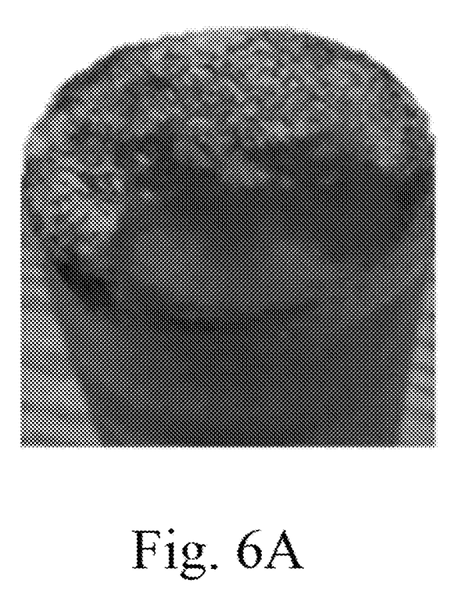
FIG. 6A shows images of coreflooding using 2.5 wt % acetic acid plus 2.5 wt % citric acid, in 28 wt. % HCl.
Figure 6B:
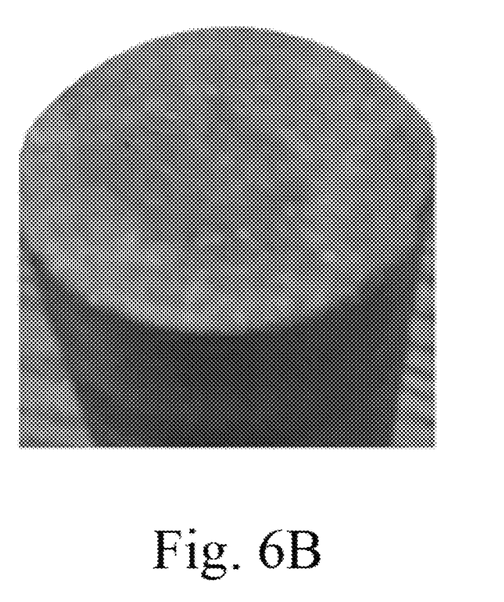
FIG. 6B shows images of coreflooding using 2.5% DTPA plus 2.5% GLDA), in 28 wt. % HCl. for comparison with FIG. 6A.

One application of inventive formulations may be in a carbonate stimulation process. Accordingly, coreflooding was carried out using an exemplary inventive formulation comprising 2.5 wt. % DTPA and 2.5 wt. % GLDA, in comparison to a formulation comprising 2.5 wt. % acetic acid and 2.5 wt. % citric acid, as shown in FIGS. 6A and 6B. Iron (3000 ppm) was dissolved in 28 wt. % HCl before running the core flooding test. The acetic acid-citric acid formulation was unsuccessful in preventing iron precipitation over the face of the core sample, as is seen in FIG. 6A. The core flooding test using the inventive formulation comprising 2.5 wt. % DTPA and 2.5 wt. % GLDA (FIG. 6B) showed an improvement over the acetic acid-citric acid formulation.

The coreflooding experiment was conducted using 6-inch (ca. 15.24 cm) diameter Indiana limestone rock samples. The back pressure was kept constant at 1000 psi (ca. 6.895 MPa) and the overburden pressure was 1500 psi (ca. 10.34 MPa). The injection rate in the two cases was 5 cm$^3$/min and the two core permeabilities were 8 and 11 md, respectively. The porosity of the two core samples was 13 and 14%, respectively. Relevant back pressures, depending upon the operation and formation conditions, may be at least 1250, 1500, 2500, 5000, 10,000, 25,000, or 50,000 psi and or up to 1,000,000, 500,000, 250,000, 100,000, 50,000, or 250,000 psi. Relevant overpressures, depending upon the operation and formation conditions, may be at least and/or up to 1.25, 1.33, 1.5, 1.75, or 2-fold any of the back-pressure endpoints. Relevant injection rates, depending upon the operation and formation conditions, may be 0.010, 0.025, 0.050, 0.1, 0.25, 0.5, 1, 5, 10, 50, 100, 250, 500, 1000, 5000, or 10,000 L/min and/or up to 1,000,000, 500,000, 250,000, 100,000, 50,000, 25,000, 10,000, 7500, 5000, 2500, 1000, 500, 250, 125, 100, 75, 50, or 25 L/min. Permeabilities may be at least 5, 6, 7, 7.5, 8.5, 9, 10, 11, 12, 13, or 14 md and/or up to 25, 22.5, 20, 17.5, 15, 14, 13, 12, 11, 10, or 9 md. Porosities may be at least 10, 11, 12, 12.5, 13, 13.5, 14, 15, 17.5, or 20% and/or up to 50, 45, 40, 35, 33, 30, 27.5, 25, 22.5, 20, 17.5, 15, 14, 13, or 12%.

A first formulation comprised 28 wt. % HCl, 3 vol. % corrosion inhibitor hexa methylene diamine tetra methylphosphonic, 5 wt. % chelating agents (2.5 wt. % acetic acid and 2.5 wt % citric acid), which may also function as corrosion inhibitors and/or iron control agents, created a wormhole but precipitated iron on the face of the core because of the inability to dissolve the iron during the reaction with calcite.

A second formulation comprised 28 wt. % HCl, 3 vol. % corrosion inhibitor: hexa methylene diamine tetra methylphosphonic, 5 wt. % chelating agents (2.5 wt. % DTPA and 2.5 wt % GLDA), which may also function as corrosion inhibitors and/or iron control agents, created wormholes, but unlike the first formulation, did not show any precipitation and the face of the core was clean as shown in FIG. 6B.

Figure 7:
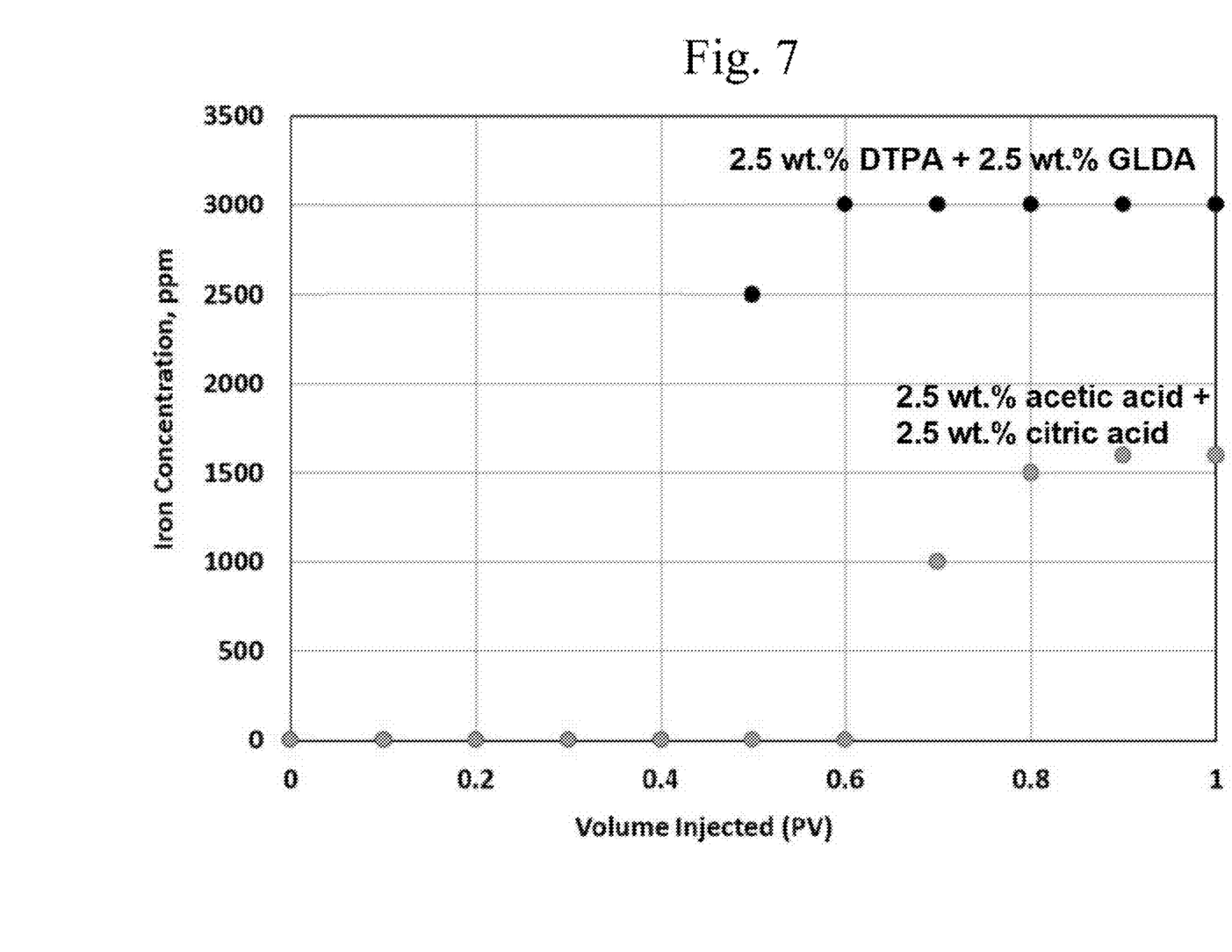
FIG. 7 shows a plot of iron concentration for an exemplary inventive formulation 2.5% DTPA plus 2.5% GLDA compared with a known formulation having 2.5 wt % acetic acid plus 2.5 wt % citric acid using ICP during the coreflooding experiments, in 28 wt. % HCl.

The iron concentration for two formulations was measured by inductively coupled plasma (ICP) atomic emission spectroscopy during the coreflooding experiments, and the results are shown in FIG. 7.

The wormhole breakthrough occurred at 0.5 PV for the second formulation, shown in FIG. 6B, and the iron concentration reached 3000 ppm, i.e., the inlet concentration. This confirms that the exemplary inventive formulation— the second formulation—kept the iron in solution and did not precipitate it.

As seen in FIG. 6A, the first formulation, comprising acetic acid and citric acid, showed a breakthrough at 0.6 PV, due to the iron precipitation on the face of the core. At the same time, the first formulation was not able to keep the iron in solution.

Finally, to compare the first formulation, comprising 2.5 wt. % acetic acid and 2.5 wt. % citric acid, with the second formulation, comprising 2.5 wt. % DTPA and 2.5 wt % GLDA, a stability test was repeated using different iron concentration. In the varied iron concentration tests, it was observed that the capacity of the second formulation is four times the capacity of existing technology, i.e., the first formulation. Invention formulations are generally capable of managing ferrous and/or ferric ions up to 3000 ppm in stimulation fluid solutions for high HCl concentration (even up to 28 wt. % or beyond) without precipitation. Whereas the first formulation dissolved 700 ppm at HCl concentrations higher than 20%.

Referring now to the drawings, wherein like reference numerals designate identical or corresponding parts throughout the several views.

FIGS. 1 to 3 show images of the results of using respective stimulation fluid formulations comprising 5 wt. % DTPA (FIG. 1), 5 wt. % HEDTA (FIG. 2), and 5 wt. % GLDA (FIG. 3), and 20 wt. % HCl. The photographs were taken after adding 3000 ppm ferric ions at varying pHs and a temperature of 72° F. (22.2° C.), to the evaluate the capability of the generated formulation to sustain 3000 ppm of iron in the solution without precipitation as a function of time. The stability of these solutions was evaluated for 96 hours and no precipitation was noticed in FIGS. 1 to 3.

FIG. 4 shows images of the failure of respective stimulation fluids using single chelating agents for iron precipitation control, i.e., 5 wt. % HEDTA (left), 5 wt. % GLDA (center), and 5 wt. % DTPA (right), in 28 wt. % HCl at pH 5 with a ferric ion concentration of 3000 ppm and a temperature of 72° F. (22.2° C.). As seen in FIG. 4, for 28 wt. % HCl stimulation fluids, there was precipitation after 96 hours.

FIG. 5 shows images of an exemplary stimulation fluid comprising a combination of 2.5 wt. % DTPA and 2.5 wt. % GLDA in 28 wt. % HCl at varied pH2 with 3000 ppm ferric ions at 72° F. (22.2° C.). The formulation in FIG. 5 was stable for at least 96 hours, i.e., the period tested.

FIG. 6A shows a photograph taken after the coreflooding experiments using the first formulation comprising 2.5 wt. % acetic acid and 2.5 wt. % citric acid, for comparison with FIG. 6B, which shows the results for coreflooding experiment with the second (inventive) formulation, comprising 2.5 wt. % DTPA plus 2.5 wt. % GLDA, each in 28 wt. % HCl.

FIG. 7 shows plots of the results for the iron concentration for the first formulation, comprising 2.5 wt. % DTPA and 2.5 wt. % GLDA, compared with the second formulation, comprising 2.5 wt. % acetic acid and 2.5 wt. % citric acid, using inductively coupled plasma (ICP) spectroscopy during the coreflooding experiments, each solution being 28 wt. % HCl.

Numerous modifications and variations of the present invention are possible in light of the above teachings. It is therefore to be understood that within the scope of the appended claims, the invention may be practiced otherwise than as specifically described herein.

The invention claimed is:

1. A well stimulation fluid, comprising:
an aqueous base fluid, and
additives consisting of HCl, at least one corrosion inhibitor, glutamic diacetic acid, and diethylene-triamine pentaacetic acid,
wherein the HCl is present in a range of from 25 to 34 wt. %, relative to total stimulation fluid weight,
wherein the at least one corrosion inhibitor is at least one selected from the group consisting of hexamethylene diamine tetramethylphosphonate, diethyl thiourea, alkyl quinolinium salt, dodecyl pyridinium bromide (DDPB), thiourea, ammonium thiocyanate, benzotriazole, benzimidazole, dibutyl thiourea, 1-phenyl-1-ene-3-butanone, cinnamaldehyde, 1-phenyl-3-methoxy-1-propene, methyl butynol, methyl pentynol, hexynol, ethyl octynol, propargyl alcohol, benzylbutynol, ethynylcyclohexanol, inulin, tannin, tannic acid, catechin, epicatechin, epigallocatechin, epicatechingallate, formamide, formic acid, and a mixture thereof,
wherein the at least one corrosion inhibitor is present in total in a range of from 1 to 5 vol. %, relative to total stimulation fluid volume;
wherein the glutamic diacetic acid is present in a range of from 2 to 2.75 wt. %, relative to the total stimulation fluid weight,
wherein the diethylene-triamine pentaacetic acid is present in a range of from 2 to 2.75 wt. %, relative to the total stimulation fluid weight,
wherein a total content of the glutamic diacetic acid and diethylene-triamine pentaacetic acid is in a range of from 4.5 to 5.5 vol. %, and
wherein the well stimulation fluid is suitable to maintain up to 3000 ppm iron ions solubilized in the fluid for at least 3 days.

2. The well stimulation fluid of claim 1, wherein the HCl is present in a concentration in a range of from 28 to 34 wt. %, relative to the total stimulation fluid weight.

3. The well stimulation fluid of claim 1, which is suitable to maintain up to 3000 ppm iron ions solubilized in the fluid for a period in a range of from 4 to 8 days.

4. The well stimulation fluid of claim 3, wherein the iron ions remain solubilized up to a pH of 4.

5. The well stimulation fluid of claim 1, wherein the glutamic diacetic acid is present in an amount of from 2.25 to 2.75 wt. %, relative to the total stimulation fluid weight.

6. The well stimulation fluid of claim 5, wherein the diethylene-triamine pentaacetic acid is present in an amount of from 2.25 to 2.75 wt. %, relative to the total stimulation fluid weight.

7. The well stimulation fluid of claim 1, wherein the glutamic diacetic acid and the diethylene-triamine pentaacetic acid are each present in a range of from 2 to 2.5 wt. %, relative to the total stimulation fluid weight.

8. The well stimulation fluid of claim 1, consisting of the aqueous base fluid and the additives,
wherein the aqueous base fluid is water.

9. The well stimulation fluid of claim 1, wherein the aqueous base fluid is water.

10. The well stimulation fluid of claim 1, wherein the glutamic diacetic acid is present in an amount of from 2.5 to 2.75 wt. %, relative to the total stimulation fluid weight.

11. The well stimulation fluid of claim 1, wherein the diethylene-triamine pentaacetic acid is present in an amount of from 2.5 to 2.75 wt. %, relative to the total stimulation fluid weight.

12. The well stimulation fluid of claim 1, wherein the glutamic diacetic acid is present in 2.5 wt. %, relative to the total stimulation fluid weight.

13. The well stimulation fluid of claim 1, wherein the diethylene-triamine pentaacetic acid is present in 2.5 wt. %, relative to the total stimulation fluid weight.

14. The well stimulation fluid of claim 1, wherein the glutamic diacetic acid is present in an amount of from 2.5 to 2.75 wt. %, relative to the total stimulation fluid weight, and
wherein the diethylene-triamine pentaacetic acid is present in an amount of from 2.5 to 2.75 wt. %, relative to the total stimulation fluid weight.

15. The well stimulation fluid of claim 1, wherein the glutamic diacetic acid is present in 2.5 wt. %, relative to the total stimulation fluid weight, and
wherein the diethylene-triamine pentaacetic acid is present in an amount of from 2.25 to 2.75 wt. %, relative to the total stimulation fluid weight.

16. The well stimulation fluid of claim 1, wherein the glutamic diacetic acid is present in an amount of from 2.25 to 2.75 wt. %, relative to the total stimulation fluid weight, and
wherein the diethylene-triamine pentaacetic acid is present in 2.5 wt. %, relative to the total stimulation fluid weight.

17. The well stimulation fluid of claim 1, wherein the glutamic diacetic acid is present in 2.5 wt. %, relative to the total stimulation fluid weight, and
wherein the diethylene-triamine pentaacetic acid is present in 2.5 wt. %, relative to the total stimulation fluid weight.

18. The well stimulation fluid of claim 1, wherein the glutamic diacetic acid is present in 2.25 wt. %, relative to the total stimulation fluid weight, and
wherein the diethylene-triamine pentaacetic acid is present in 2.25 wt. %, relative to the total stimulation fluid weight.

19. The well stimulation fluid of claim 1, consisting of the aqueous base fluid and the additives, and having no corrosion inhibitor, wherein the aqueous base fluid is water.

* * * * *